May 10, 1966
A. M. ALPER ET AL
3,250,632
REFRACTORY AND FURNACE LINING
Filed May 6, 1963
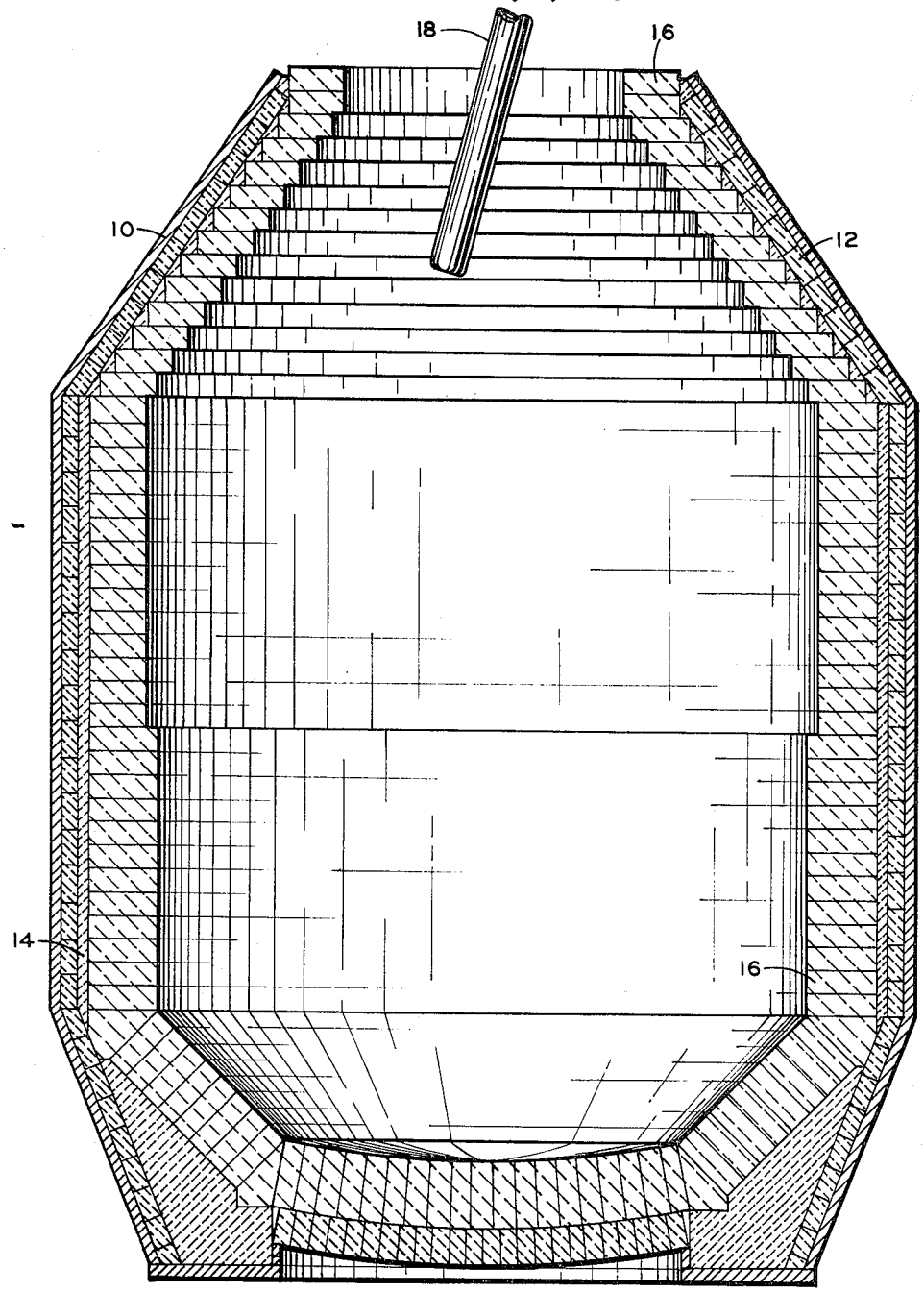
INVENTORS
Allen M. Alper
Robert N. McNally
BY Clarence R. Patty, Jr.
ATTORNEY

United States Patent Office 3,250,632
Patented May 10, 1966

3,250,632
REFRACTORY AND FURNACE LINING
Allen M. Alper, Corning, and Robert N. McNally, Horseheads, N.Y., assignors to Corhart Refractories Company, Louisville, Ky., a corporation of Delaware
Filed May 6, 1963, Ser. No. 278,322
6 Claims. (Cl. 106—58)

This invention relates to a novel fused cast basic refractory material, which is especially suitable for use in basic oxygen steelmaking furnaces, and to basic oxygen furnaces or vessels containing a lining made up of the novel fused cast refractory material. As is well known, fused cast refractory is the type of refractory material which is commonly produced by melting a mass of refractory material of the desired composition, casting and cooling the molten refractory material to form a solidfied refractory mass. In some cases, a distinct casting step is omitted; the molten refractory is solidified within the same container in which it was melted. Moreover, the novel fused cast basic refractory material can be made in the form of small granules or grain by the well known techniques of disintegrating the molten refractory into small globules, which are then solidified.

A basic oxygen furnace, in broad terms, comprises a substantially pear-shaped steelmaking vessel or converter generally similar to those used in the Thomas or basic Bessemer process developed in 1877, but in which pure oxygen is used instead of air. The Thomas vessels had a basic refractory lining, utilized a basic slag and were bottom blown with air. The modern day basic oxygen furnaces, vessels or converters, developed in the past decade, while continuing the use of a basic refractory lining and a basic slag, commonly differ from the old Thomas vessels (in addition to employing oxygen instead of air) in that they are top blown instead of bottom blown. The tuyeres in the bottom of the old Thomas vessels are omitted and instead positively cooled oxygen lances (e.g., water cooled copper tubing) are positioned downwardly into the open top of the converters or vessels so as to direct the blast of oxygen onto the surface of the molten metal in the converters or vessels. It is these top blown types of basic oxygen furnaces or converters that are used in the now well known processes, such as the LD process developed in Austria, the Rotor process developed in Germany and the Stora-Kaldo process developed in Sweden. Of course, there are also the side-blown types of converters (e.g., Tropenas converters) that might be employed as basic oxygen furnaces when equipped with appropriate basic refractory lining.

The environment in basic oxygen steelmaking furnaces presents a rather severe corrosion and erosion problem for the working linings, particularly for the side wall linings. The more detrimental factors of such environment contributing to this problem are: the high temperatures developed by the oxygen blast, the washing action of the molten contents against the refractory linings, the corrosive nature of the high lime slags and slag vapors, and the reducing nature of the carbon monoxide atmosphere developed. Refractories that have been utilized for working linings in these furnaces have been composed of burnt or tar bonded dolomites and magnesites or mixtures thereof. Although these refractories exhibit a relatively modest corrosion-erosion resistance in basic oxygen furnace environments, there has developed a great desire on the part of the operators of these furnaces for a refractory having a greatly improved corrosion-erosion resistance in order to increase the life of the working linings.

We have now discovered a novel basic fused cast refractory that possess a corrosion-erosion resistance in basic oxygen furnace environments greatly superior to that of the burnt or tar bonded basic refractory used heretofore. Accordingly, it is an object of this invention to provide such novel and improved basic fused cast refractory. It is another object of this invention to provide, in a basic oxygen furnace, a lining of the aforesaid novel and improved basic fused cast refractory capable of longer service life than the burnt or tar bonded basic refractories used heretofore. Additional objects, features and advantages of the present invention will become apparent, to those skilled in the art, from the following detailed description and the attached drawing, wherein the sole figure is a vertical, cross-sectional view of a representative basic oxygen vessel having a working lining made up of basic fused cast refractory brick according to this invention.

Our novel fused cast refractory material broadly consists essentially of, analytically in percent by weight, at least about 80% MgO plus CaO plus BaO plus SrO, the MgO being at least 50% the total of CaO plus BaO plus SrO being less than 35%, and 0.2 to 20% fluorine. This superior corrosion-erosion resistant fused cast refractory is readily manufacturable into substantially crack-free bodies by melting a mixture of suitable raw materials, for example, magnesia and magnesium fluorine or magnesia and calcium fluoride. As will be appreciated, relatively high temperatures (e.g., approx. 2000–2800° C.) are required to fuse and melt the compositions of this invention. Preferably, conventional electric arc melting furnaces are employed, although any other suitable means can be used as desired. The raw batch materials are suitably proportioned to provide the desired final composition by allowing for the normal volatilization of part of the fluorine-containing ingredient that occurs at the high melting temperatures employed. As a general rule, we have found that fluorine retained in the solidified refractory material amounts to at least about 15% by weight of the fluorine content of the initial batch mixture. Thus, it is necessary to provide an appropriatee excess of the fluorine-containing ingredient in the batch in order to obtain the desired retained amount in the solidified material. Preferably, the batch materials are premixed prior to charging into the melting furnace.

The more usual form of our novel refractory for lining basic oxygen furnaces is that of bricks cast to shape, or cut from billets cast, by pouring the molten batch material into conventional preformed molds of any suitable material, e.g., graphite, sand or steel, and allowing it to cool and solidify according to conventional practice, for example, as disclosed in United States Patent 1,615,750 to G. S. Fulcher, to which reference may be had. If desired, of course, the novel refractory material can be melted and solidified in the same container. However, if desired, a stream of the molten refractory batch material can be disintegrated by known conventional techniques into small globules of desired size and then solidified as a mass of fused cast granular material. This granular material can then be used to form rebonded bricks of special shape that are not as easily formed by directly casting the shape from the molten material. Moreover, the granular material for making rebonded bricks can be obtained by crushing cast blocks or billets of the novel refractory material.

Referring now to the drawing, the basic oxygen furnace or vessel shown comprises a metal shell or tank 10, a permanent or tank lining 12, a rammed refractory interlayer 14, a working lining 16 and a lance 18 for introducing an oxygen blast. The lining 12 and interlayer 14 form a heat insulator to protect shell 10. In this typical illustration, the shell 10 is made of steel. The permanent lining 12 is often made up of burned magnesia brick and the rammed interlayer 14 is formed of a conventional tar-dolomite ramming mix. The working lining 16 is built up of our novel fused cast basic refractory brick. The bricks in lining 16 are laid up usually with a conventional magnesia type mortar between the bricks.

In addition to magnesium fluoride and calcium fluoride, or in substitution therefor, other suitable fluorine-containing source material can be used to produce the novel refractory of this invention, for example, barium fluoride, strontium fluoride or aluminum fluoride and combinations of any the named fluorides. When utilizing the fluorides other than magnesium fluoride, the novel refractory will also analytically contain minor amounts of the respective metal oxides as a result of the partial loss of fluorine during melting.

Other additives or impurities, in small amounts, can be incorporated in the novel refractory without adversely affecting the superior corrosion-erosion resistance. Moreover, we have found that certain additives produce special benefits. Thus, where storage and shipping of the novel refractory present problems of hydration, we have found that silica, titanium oxide, zirconium oxide, aluminum oxide and/or chromium oxide effectively inhibit hydraton in the novel refractory.

In general, the novel refractory may contain one or more of the following constituents, but in the limited quantities indicated for the appropriate MgO content in order to avoid adversely affecting the superior corrosion-erosion resistance (analytically in weight percent):

| When MgO content is | 50 up to <80 | At least 80 |
|---|---|---|
| $CaO+BaO+SrO$ | Less than 35 | Less than 19. |
| $Al_2O_3$ | Less than 6 | Less than 10. |
| $Cr_2O_3$ | Less than 4 | Up to 18. |
| $SiO_2$ | Less than 4 | Up to 8. |
| $TiO_2$ | Less than 8 | Up to 12. |
| $ZrO_2$ | Less than 10 | Up to 15. |
| FeO | Up to 10 | Up to 10. |
| $Al_2O_3+Cr_2O_3+SiO_2+TiO_2+ZrO_2$ | Not more than 10 | |

In order to insure good hydration resistance, especially when calcium fluoride is used as the source of fluorine (or when substantial amounts of CaO, BaO or SrO are included), the refractory composition should include an effective amount of at least one of the hydration inhibiting ingredients, viz., $Al_2O_3$, $Cr_2O_3$, $SiO_2$, $TiO_2$ and $ZrO_2$. Particular compositions of refractory material according to this invention and having good hydration resistance consist essentially of, analytically by weight, at least 80% MgO, at least 0.2% fluorine, at least one member selected from the group consisting of: 1 to 8% $Al_2O_3$, 5 to 18% $Cr_2O_3$, 1 to 8% $SiO_2$, 2 to 12% $TiO_2$ and 2 to 15% $ZrO_2$, and the balance, if any, substantially all CaO.

For optimum properties and results in basic oxygen furnace service, the following compositional limits should be adhered to (analytically in weight percent):

|  | Percent |
|---|---|
| MgO | At least 88 |
| Fluorine | 0.20 to 5.0 |
| CaO | Up to 11.8 |
| $Al_2O_3$ | <5 |
| $Cr_2O_3$ | <10 |
| $SiO_2$ | <3 |
| $TiO_2$ | <5 |
| $ZrO_2$ | Up to 5 |
| FeO | <5 |

By way of illustrating and providing a better appreciation of the present invention, the following detailed description and data is given concerning refractory samples, within the invention and of prior art materials, and their properties or characteristics.

Table I shows composition mixtures that were electric arc melted and solidified to form refractory material according to the present invention. The proportions are in percent by weight.

TABLE I

| Melt No. | Magnesia | Fluoride [1] | Alumina | Chromic oxide | Silica | Other |
|---|---|---|---|---|---|---|
| 1 | 90 | 10 | | | | |
| 2 | 85 | 15 | | | | |
| 3 | 80 | 20 | | | | |
| 4 | 70 | 30 | | | | |
| 5 | 50 | 50 | | | | |
| 6 | 90 | 8 | | | 2 | |
| 7 | 80 | 18 | | | 2 | |
| 8 | 95 | 5 | | | | |
| 9 | 90 | 10 | | | | |
| 10 | 85 | 15 | | | | |
| 11 | 80 | 20 | | | | |
| 12 | 70 | 30 | | | | |
| 13 | 60 | 40 | | | | |
| 14 | 50 | 50 | | | | |
| 15 | 85 | 10 | 5 | | | |
| 16 | 80 | 10 | 5 | 5 | | |
| 17 | 80 | 5 | 5 | 10 | | |
| 18 | 80 | 5 | 5 | 5 | | 5 $TiO_2$. |
| 19 | 85 | 13 | | | 2 | |
| 20 | 85 | 10 | | | 5 | |
| 21 | 80 | 10 | | | 10 | |
| 22 | 80 | 5 | | | 15 | |
| 23 | 80 | 12 | | | 3 | |
| 24 | 80 | 5 | | | 5 | 10 T.C.O.[2] |
| 25 | 80 | 5 | | | | {10 T.C.O.[2] / 5 $TiO_2$. |
| 26 | 93 | 5 | | | 2 | |
| 27 | 90 | 9.5 | | | 0.5 | |
| 28 | 90 | 8 | | | 2 | |
| 29 | 85 | 13 | | | 2 | |
| 30 | 80 | 18 | | | 2 | |
| 31 | 80 | 15 | | | 5 | |
| 32 | 88 | 2 | | | | 10 $TiO_2$. |
| 33 | 85 | 12 | | | | 3 $TiO_2$. |
| 34 | 80 | 10 | | | | 10 $TiO_2$. |
| 35 | 85 | 13 | | | | 2 $ZrO_2$. |
| 36 | 85 | 10 | | | | 5 $ZrO_2$. |

[1] Purified magnesium fluoride was used in the first seven melts, fluorspar in all the other melts.
[2] Transvaal chrome ore.

The various constituents in the above mixtures were provided by common commercially available raw materials whose typical chemical analyses, in weight percent, were as follows:

*Calcined magnesite.*—98.51% MgO, 0.86% CaO, 0.28% SiO$_2$, 0.22% Fe$_2$O$_3$, 0.13% ignition loss.

*Purified magnesium fluoride.*—85.0% MgF$_2$, 3.00% MgO, 11.50% ignition loss (H$_2$O).

*Silica sand.*—99.92% SiO$_2$, 0.04% Al$_2$O$_3$.

*Fluorspar.*—97.3% CaF$_2$, 1.1% CaCO$_3$, 1.1% SiO$_2$, 0.5% Fe$_2$O$_3$.

*Bayer process alumina.*—99.2% Al$_2$O$_3$, 0.45% Na$_2$O, 0.03% Fe$_2$O$_3$, 0.02% SiO$_2$, 0.3% ignition loss.

*Green chrome oxide.*—99.75% Cr$_2$O$_3$.

*Rutile.*—96–98% TiO$_2$, 1% max. Fe$_2$O$_3$, 0.3% ZrO$_2$, 0.3% Al$_2$O$_3$, 0.25% SiO$_2$, 0.1% Cr$_2$O$_3$, 0.29% V$_2$O$_5$, 0.025–0.05% P$_2$O$_5$, 0.01% S.

*Transvaal chrome ore.*—44% Cr$_2$O$_3$, 23% FeO, 13% Al$_2$O$_3$, 12% MgO, 4% SiO$_2$, 0.5% CaO, 0.4% TiO$_2$.

*Zirconia.*—85.03% ZrO$_2$, 10.00% Al$_2$O$_3$, 4.36% SiO$_2$, 0.15% Fe$_2$O$_3$, 0.18% TiO$_2$, 0.28% CaO.

As will be readily apparent, these fused mixtures will provide analytical compositions clearly within the scope of the invention as previously defined because of the partial volatilization of the fluoride materials. To illustrate this point, the solidified product of eight melts were chemically analyzed by known procedures and the results are shown in Table II, expressed in percent by weight:

TABLE II [1]

| Melt No. | MgO [2] | Fluorine | SiO$_2$ | CaO |
|---|---|---|---|---|
| 1 | 98.80 | 1.20 | | |
| 5 | 91.60 | 8.40 | | |
| 6 | 96.01 | 1.29 | 2.7 | |
| 11 | 87.68 | 3.24 | 0.50 | 8.58 |
| 12 | 73.82 | 7.18 | | 19. |
| 13 | 76.94 | 7.06 | | 16. |
| 14 | 70.87 | 9.13 | | 20. |
| 29 | 90.17 | 1.57 | 1.83 | 6.43 |

[1] Single analyses for each melt, except for Melt No. 29 where results are average of four separate analyses with variations within the following limits: MgO±1.0, fluorine±0.63, SiO$_2$±0.35, CaO±0.63.
[2] By difference.

Thus, fluorine retention is fairly consistent in the arc melted product usually ranging from about 15% to 30% for the purified magnesium fluoride as the fluoride batched ranges from about 5% to 50% of the batch, respectively, and from about 25% to 70% for the fluorspar as the amount batched ranges from about 5% to 60% of the batch, respectively. In view of the noted consistency, not all of the products of the examples in Table I were subjected to the expense and time consuming procedure of chemical analysis.

Table III shows the results of slag resistance tests for various refractory samples, within the invention and of prior art materials. The numbered samples were the solidified products of the correspondingly numbered melts in Table I. Samples A were of a commercial tar bonded dolomite brick. Samples B were of a commercial tar bonded magnesia brick. Samples C were of a fused cast material analyzing, in percent by weight, 62.92% MgO, 0.16% fluorine, 0.92% CaO, 25.4% Al$_2$O$_3$, 6.5% Cr$_2$O$_3$, 0.7% SiO$_2$ and 3.4% FeO. This latter fused cast material is of the prior invention made by the present inventors and disclosed in their copending United States application Serial No. 137,475, filed July 28, 1961, now Patent No. 3,132,954.

The slag resistance test, from which the data in Table III were obtained, comprises placing 1½″ x 1″ x ½″ samples in a gas-oxygen furnace adapted to simulate a basic oxygen furnace. At 1700° C. for about two hours, the samples were passed, with one of their largest surfaces facing upward, through a downwardly directed stream of molten basic slag droplets at a substantially uniform rate of 72 times per hour. The slag was a representative basic oxygen furnace slag of the following composition, in percent by weight: 22% Fe$_3$O$_4$, 20% SiO$_2$, 39% CaO, 10% 4CaO·P$_2$O$_5$, 6% MgO and 3% Al$_2$O$_3$. At the end of the two hour test, the average thickness of the samples was measured and compared with the original ½″ thickness prior to testing. The results given in Table III express this comparison as a percentage change in thickness.

TABLE III

| Samples | Percent slag cut | Samples | Percent slag cut |
|---|---|---|---|
| 2 | 10, 11 | 23 | [1] 16 |
| 3 | 9, 8 | 24 | 10 |
| 6 | 9, 9, 9, 11 | 25 | 7 |
| 7 | 8, 12 | 26 | 16, 16 |
| 8 | 6, 12 | 27 | 12 |
| 9 | 11 | 28 | 12, 14 |
| 10 | 12, 12, 19 | 29 | 12, 13, 17, 18, 10 |
| 11 | 13, 12, 16, 18 | 30 | 13 |
| 16 | 12 | 31 | 14 |
| 17 | 12 | 33 | 12 |
| 18 | 10 | 34 | 11 |
| 19 | 15, 14 | A | 70, 32 |
| 20 | 12, 12 | B | 27, 29 |
| 21 | 8 | C | 39, 30, 28 |
| 22 | 12, 16 | | |

[1] Average of nine samples.

The data in Table III clearly shows the substantial improvement in corrosion-erosion resistance of the refractory material of the present invention for basic oxygen furnace service. It is also notable that a prior basic fused cast refractory, that has been used in open hearth furnaces, shows substantially no better corrosion-erosion resistance than the tar bonded refractory materials that have been used for basic oxygen furnace service. Thus, for that reason, it is very important that the previously mentioned constituents be kept within the proportions specified.

Table IV shows the results of hydration tests for various refractory samples within the present invention. The samples were the solidified products of the correspondingly numbered melts in Table I. The tests comprised either (1) submerging the samples in boiling water or (2) placing the samples in an atmosphere heated to 150° F. and maintained at 100% humidity. The samples were continuously held in these two respective mediums until a piece spalled or flaked off or an open crack formed with a minimum opening width of at least 1/32 inch, at which time the total number of hours of holding were noted. In four cases noted in Table IV, the tests were discontinued prior to spalling or open cracking as noted above because the considerable time already consumed clearly indicated superior hydration resistance.

TABLE IV

| Sample [1] | Boiling H$_2$O submersion (hours) | 100% humidity at 150° F. (hours) |
|---|---|---|
| 1 | [2] 290 | |
| 11 | 3 | 20 |
| 10 | 4 | |
| 29 | 13 | 68 |
| 15 | 29 | |
| 23 | 155 | [2] 119 |
| 33 | [2] 382½ | |
| 36 | [2] 290 | |

[1] Samples 11, 23 and 29 were 3″ x 4″ x 4″; samples 1, 10, 15, 33 and 36 were 1″ x 1″ x 3″.
[2] Test discontinued without occurrence of spall or open crack of at least 1/32 inch.

As is readily evident from Tables I and IV, the susceptibility to hydration, which is most noticeable in the refractory material made with calcium fluoride, is greatly reduced by the small additions of one or more of Al$_2$O$_3$, Cr$_2$O$_3$, SiO$_2$, TiO$_2$ and ZrO$_2$. While these additives should be limited within the amounts, and for the reasons previously mentioned, especial care should be taken to avoid excessive quantities for the reason that they will severely lower the resistance to hot load deformation of the fused cast material. Thus, it is essential for good resistance to hot load deformation that the sum of these five additives not exceed about 10% when the MgO content is lower than about 80%. Even when the MgO content is at least 80% or more, it is particularly necessary that the $Al_2O_3$ be less than 10%, the $SiO_2$ not exceed 8% and the $TiO_2$ not exceed 12% for the same reason. Excessive $SiO_2$ also severely reduces the modulus of rupture at room temperature.

The refractory material of this invention having the preferred composition with at least 88% MgO, and in the form of cast blocks, is generally characterized by yielding less than 5% linear deformation at about 2000° C., and even as high as 2200° C., when subjecting a 1″ cube to a loading of 25 p.s.i. while the cube is heated up at a rate of 100° C./hour.

As used in this specification and the following claims, the term "analytically" means that the fluorine content and the content of oxides of the various metals and metalloids in the refractory are calculated, respectively, in terms of uncombined fluorine and the specific oxide compounds indicated, e.g., $TiO_2$, $FeO$, etc.

It should be noted that, while the novel basic oxygen furnace linings constructed of the herein described novel basic fused refractory material are considered a part of the present invention, the novel refractory material per se can be applied in other forms, structures and uses as desired or deemed suitable without departing from the scope of the invention. For example, the cast blocks can be appropriately cut and assembled to form rocket nozzles or linings in a magnetohydrodynamic generator. Furthermore, although the present invention has been described with respect to specific details of certain embodiments thereof, it is not intended that such details be limitations upon the scope of the invention except insofar as set forth in the claims.

What is claimed is:

1. A fused cast refractory material consisting essentially of, analytically by weight, at least about 80% MgO plus CaO plus BaO plus SrO, the MgO being not less than 50%, the total of CaO plus BaO plus SrO being less than 35%, 0.2 to 20% fluorine, less than 6% $Al_2O_3$, less than 4% $Cr_2O_3$, less than 4% $SiO_2$, less than 8% $TiO_2$, less than 10% $ZrO_2$, the sum of $Al_2O_3$ plus $Cr_2O_3$ plus $SiO_2$ plus $TiO_2$ plus $ZrO_2$ not exceeding 10%, and up to 10% FeO.

2. A fused cast refractory material consisting essentially of, analytically by weight, at least 80% MgO, at least 0.2% fluorine, at least one member selected from the group consisting of: 1 to 8% $Al_2O_3$, 5 to 18% $Cr_2O_3$, 1 to 8% $SiO_2$, 2 to 12% $TiO_2$ and 2 to 15% $ZrO_2$, and the balance, if any, substantially all CaO.

3. A fused cast refractory material consisting essentially of, analytically by weight, at least 88% MgO, 0.20 to 5.0% fluorine, up to 11.8% CaO, less than 5% $Al_2O_3$, less than 10% $Cr_2O_3$, less than 3% $SiO_2$, less than 5% $TiO_2$, up to 5% $ZrO_2$ and less than 5% FeO.

4. A fused cast refractory material according to claim 3 including an effective amount of at least one of the hydration inhibiting ingredients selected from the group consisting of $Al_2O_3$, $Cr_2O_3$, $SiO_2$, $TiO_2$ and $ZrO_2$.

5. A fused cast refractory material consisting of, analytically by weight, at least about 80% MgO plus CaO plus BaO plus SrO, the MgO being not less than 50%, the total CaO plus BaO plus SrO being less than 35%, and the balance 0.2 to 20% fluorine.

6. A fused cast refractory material consisting of, analytically by weight, at least about 80% MgO plus CaO plus BaO plus SrO, the MgO being 50 to less than 80%, the total of CaO plus BaO plus SrO being less than 35%, less than 6% $Al_2O_3$, less than 4% $Cr_2O_3$, less than 4% $SiO_2$, less than 8% $TiO_2$, less than 10% $ZrO_2$, the sum of $Al_2O_3$ plus $Cr_2O_3$ plus $SiO_2$ plus $TiO_2$ plus $ZrO_2$ not exceeding 10%, up to 10% FeO and the balance 0.2 to 20% fluorine.

References Cited by the Examiner
UNITED STATES PATENTS

| | | | |
|---|---|---|---|
| 1,954,552 | 4/1934 | Williams et al. | 106—58 |
| 2,075,694 | 3/1937 | Benner et al. | 106—63 |
| 2,235,077 | 3/1941 | McMullen | 106—62 |
| 2,893,134 | 2/1958 | Atlas | 106—58 |

TOBIAS E. LEVOW, *Primary Examiner.*

J. POER, *Assistant Examiner.*